United States Patent
Arslanturk et al.

(10) Patent No.: US 9,765,712 B2
(45) Date of Patent: Sep. 19, 2017

(54) SYSTEM AND METHOD FOR TURBOCHARGER COMPRESSOR SURGE CONTROL

(71) Applicant: Cummins Inc., Columbis, IN (US)

(72) Inventors: Emrah Arslanturk, Greenwood, IN (US); Orcun Kurugol, Greenwood, IN (US); Ohiorenuan J. Amu, Greenwood, IN (US)

(73) Assignee: CUMMINS INC., Columbus, IN (US)

( * ) Notice: Subject to any disclaimer, the term of this patent is extended or adjusted under 35 U.S.C. 154(b) by 157 days.

(21) Appl. No.: 14/250,770

(22) Filed: Apr. 11, 2014

(65) Prior Publication Data

US 2015/0292443 A1 Oct. 15, 2015

(51) Int. Cl.
*F02D 41/00* (2006.01)
*F02D 21/08* (2006.01)
(Continued)

(52) U.S. Cl.
CPC ......... *F02D 41/0007* (2013.01); *F02D 21/08* (2013.01); *F02D 41/0052* (2013.01);
(Continued)

(58) Field of Classification Search
CPC .......................... F02D 41/0005; F02D 41/0007
(Continued)

(56) References Cited

U.S. PATENT DOCUMENTS

| | | | | |
|---|---|---|---|---|
| 4,164,033 A | * | 8/1979 | Glennon | ............. F04D 27/0207 |
| | | | | 415/17 |
| 6,178,749 B1 | * | 1/2001 | Kolmanovsky | ......... F02B 37/18 |
| | | | | 60/605.2 |

(Continued)

FOREIGN PATENT DOCUMENTS

| | | | |
|---|---|---|---|
| EP | 2 395 223 | | 6/2012 |
| KR | 102005068989 | * | 7/2005 |
| WO | 2008/021632 | | 2/2008 |

OTHER PUBLICATIONS

KR10-2005-068989 English Translation.*
(Continued)

*Primary Examiner* — Phutthiwat Wongwian
*Assistant Examiner* — Jessica Kebea
(74) *Attorney, Agent, or Firm* — Faegre Baker Daniels LLP

(57) ABSTRACT

An internal combustion engine having intake and exhaust manifolds, a turbocharger with a compressor, and at least one of: an exhaust gas recirculation (EGR) valve and a variable geometry turbine (VGT). The system further includes a control computer configured to determine at least one of torque demand, pressure across the compressor, and pressure gradient ratio between the exhaust manifold and the intake manifold relative to one of exhaust manifold pressure, intake manifold pressure, and 1. The control computer performs at least one of: closing the EGR valve in response to the determined at least one of torque demand, pressure across the compressor, and pressure gradient ratio, and lessening restriction provided by the variable geometry turbine responsive to the determined at least one of torque demand, pressure across the compressor, and pressure gradient between the exhaust manifold and the intake manifold.

15 Claims, 5 Drawing Sheets

(51) Int. Cl.
*F02M 26/02* (2016.01)
*F02M 26/04* (2016.01)
*F02M 26/45* (2016.01)
*F02M 26/47* (2016.01)
*F02M 26/48* (2016.01)
*F02M 26/49* (2016.01)
*F02B 37/22* (2006.01)
*F02B 37/24* (2006.01)
*F02M 26/05* (2016.01)

(52) U.S. Cl.
CPC .............. *F02M 26/48* (2016.02); *F02B 37/22* (2013.01); *F02B 37/24* (2013.01); *F02D 2200/0402* (2013.01); *F02D 2200/0406* (2013.01); *F02M 26/05* (2016.02); *F02M 26/47* (2016.02); *Y02T 10/144* (2013.01); *Y02T 10/47* (2013.01)

(58) Field of Classification Search
USPC ....................................................... 60/605.2
See application file for complete search history.

(56) References Cited

U.S. PATENT DOCUMENTS

| | | | |
|---|---|---|---|
| 6,298,718 B1 | 10/2001 | Wang | |
| 6,408,624 B1 | 6/2002 | Books et al. | |
| 6,506,010 B1 | 1/2003 | Yeung et al. | |
| 7,089,738 B1 | 8/2006 | Boewe et al. | |
| 7,107,770 B2* | 9/2006 | Shirakawa | F02D 41/0007 123/305 |
| 7,296,561 B2* | 11/2007 | Shirakawa | F02D 41/0005 123/493 |
| 7,322,194 B2* | 1/2008 | Sun | F02B 37/013 123/568.11 |
| 7,587,888 B2* | 9/2009 | Shirakawa | F01N 3/021 123/568.21 |
| 8,161,744 B2* | 4/2012 | Winsor | F02B 39/16 415/17 |
| 8,191,369 B2* | 6/2012 | Geyer | F02B 37/16 123/568.11 |
| 8,307,645 B2* | 11/2012 | Mischler | F02B 39/16 415/17 |
| 8,352,152 B2 | 1/2013 | Serres | |
| 2005/0188695 A1* | 9/2005 | Shirakawa | F02D 41/0007 60/605.2 |
| 2007/0068158 A1 | 3/2007 | Sun et al. | |
| 2008/0034753 A1* | 2/2008 | Furman | F04D 27/001 60/605.1 |
| 2008/0167790 A1 | 7/2008 | Kotooka et al. | |
| 2009/0223218 A1 | 9/2009 | Winsor et al. | |
| 2011/0029220 A1* | 2/2011 | Sasaki | F02B 37/24 701/106 |
| 2012/0144806 A1* | 6/2012 | Hamamatsu | F02D 41/0052 60/278 |
| 2012/0265425 A1* | 10/2012 | Maruyama | F02D 41/0002 701/104 |

OTHER PUBLICATIONS

International Search Report and Written Opinion dated Jul. 30, 2015 in corresponding International Application No. PCT/US2015/025061.

Final Office Action dated Feb. 27, 2008 in U.S. Appl. No. 11/464,562.

* cited by examiner

US 9,765,712 B2

SYSTEM AND METHOD FOR TURBOCHARGER COMPRESSOR SURGE CONTROL

FIELD OF THE DISCLOSURE

The present invention relates generally to systems for controlling turbocharged internal combustion engines, and more specifically to systems for controlling turbocharger compressor surge.

BACKGROUND

Turbocharging machinery is well-known and commonly used in the internal combustion engine industry to pressurize intake air entering the engine combustion chambers and thereby increase the efficiency and power output of the engine. In general, pressurizing the intake air increases the quantity of air entering the engine cylinders during the intake stroke, and this allows more fuel to be utilized in establishing a desired air/fuel ratio. Increased available engine output torque and power thereby results.

Conventional turbochargers for internal combustion engines include a turbine disposed in the path of exhaust gas exiting the engine exhaust manifold, wherein the turbine typically includes a wheel that is rotated via the flow of exhaust gas thereby. The turbine wheel is rotatably coupled to a wheel of a compressor disposed in-line with the air intake system of the engine. Rotation of the turbine by the exhaust gas flow causes the compressor wheel to likewise rotate, wherein rotation of the compressor wheel acts to increase the flow of fresh air to, and consequently the air pressure within, the air intake system. Generally, the rotational speed of the turbocharger turbine and compressor wheels, and hence the air pressure within the air intake system, is proportional to the flow rate of exhaust gas, which is itself proportional to engine speed.

In the operation of turbochargers of the type just described, a condition known as turbocharger compressor surge is known to occur under certain engine and air handling system operation. Generally, turbocharger compressor surge occurs when the accumulated pressure in the intake manifold (downstream of the compressor) exceeds the ability of the compressor to sustain positive air movement (i.e. the intake manifold pressure downstream of the compressor is so great that the compressor lacks sufficient power to compress more air into the intake manifold). This causes significant resistance to the rotational motion of the vanes of the compressor. The compressor then effectively "stalls out" and stops (or significantly slows) or even reverses air being pumped in by the compressor (i.e. surge). As a result, high vibration, temperature increases, undesired noise, and rapid changes in axial thrust can occur. These occurrences can damage the rotor seals, rotor bearings, the compressor driver and cycle operation. When this occurs, intake manifold air pressure decreases by an amount generally proportional to the intensity of the surge condition. Light compressor surge that produces an audible sound is also called compressor "chuff."

A number of engine and air handling system conditions contribute to, and define, turbocharger compressor surge including, for example, engine speed, engine fueling rate, turbocharger speed, mass flow rate of intake air, intake manifold pressure, intake manifold volume, intake manifold temperature, and the like. In engines including exhaust gas recirculation systems, another engine operating parameter that impacts and defines turbocharger compressor surge is the flow rate of exhaust gas recirculated to the intake manifold, which affects the mass flow rate of intake air and intake manifold pressure.

What is therefore needed is a system for monitoring conditions that are indicative of surge, and then taking affirmative steps to prevent the onset of surge.

DETAILED DESCRIPTION

Figure 1:
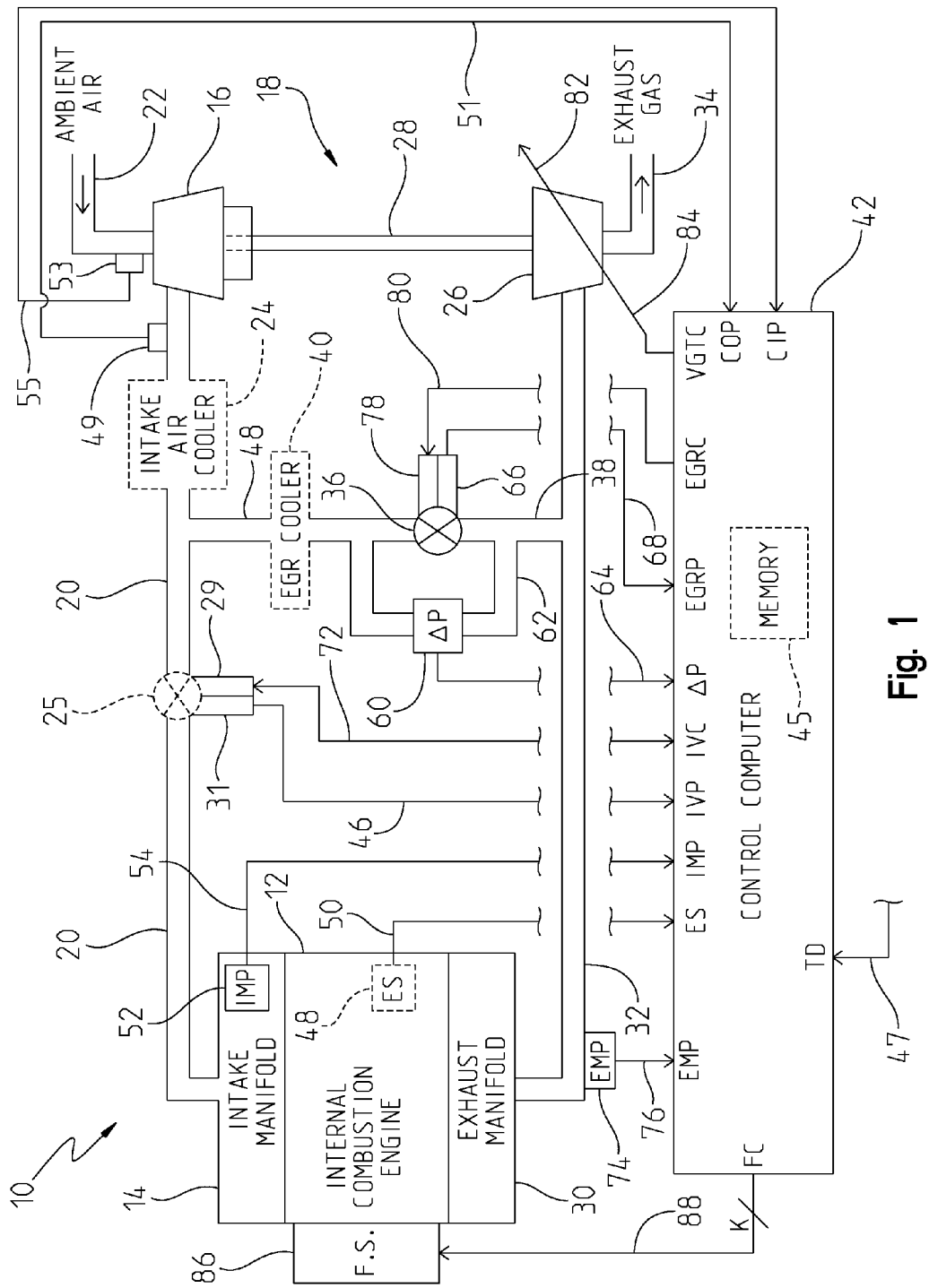
FIG. 1 is a diagram of one illustrative embodiment of a system for controlling turbocharger compressor surge.

For the purposes of promoting an understanding of the principles of the invention, reference will now be made to a number of embodiments illustrated in the drawings and specific language will be used to describe the same. It will nevertheless be understood that no limitation of the scope of the invention is thereby intended.

Briefly, in one example, a system for controlling turbocharger compressor surge is provided. The system includes an internal combustion engine having intake and exhaust manifolds. The system also has a turbocharger with a compressor that has an inlet fluidly coupled to ambient and an outlet fluidly coupled to the intake manifold. The system further includes at least one of: an exhaust gas recirculation (EGR) valve and a variable geometry turbine (VGT). The EGR valve disposed in-line with an EGR conduit fluidly coupled between said intake and exhaust manifolds, said EGR valve responsive to an EGR valve control signal to control exhaust gas flow therethrough. The VGT fluidly coupled to the exhaust manifold the VGT responsive to a VGT control signal to control the geometry thereof. The system further includes a control computer configured to determine at least one of torque demand, pressure across the compressor, and pressure gradient between the exhaust manifold and the intake manifold. The control computer performs at least one of: closing the EGR valve in response to the determined at least one of torque demand, pressure across the compressor, and pressure gradient between the exhaust manifold and the intake manifold, and lessening restriction provided by the variable geometry turbine responsive to the determined at least one of torque demand, pressure across the compressor, and pressure gradient between the exhaust manifold and the intake manifold.

In another example, a method of operating a turbocharger compressor is provided including determining at least one of torque demand, pressure across the compressor, and pressure gradient between an exhaust manifold and an intake manifold of an engine coupled to the compressor; and performing at least one of: closing an EGR valve of the engine in response to the determined at least one of torque demand, pressure across the compressor, and pressure gradient between the exhaust manifold and the intake manifold and lessening a restriction provided by a variable restrictor turbine that is in-line with an exhaust manifold responsively to the determined at least one of torque demand, pressure across the compressor, and pressure gradient between the exhaust manifold and the intake manifold.

In yet another example, a non-transitory computer-readable media having instructions thereon for controlling operation of an engine is provided. The instructions, when interpreted by a processor, cause the processor to: determine at least one of torque demand, pressure across the compressor, and pressure gradient between an exhaust manifold and an intake manifold of an engine coupled to the compressor; and emit at least one signal operative to perform at least one of: close an EGR valve of the engine in response to the determined at least one of torque demand, pressure across the compressor, and pressure gradient between the exhaust manifold and the intake manifold, and lessen a restriction provided by a variable restrictor turbine that is in-line with an exhaust manifold responsively to the determined at least one of torque demand, pressure across the compressor, and pressure gradient between the exhaust manifold and the intake manifold.

In another example, an engine control unit is provided including a first input operable to receive a signal indicative of at least one of torque demand, pressure across the compressor, and pressure gradient between the exhaust manifold and the intake manifold; a processor operable to generate at least one signal of: an EGR valve signal instructing closure of the EGR valve in response to the determined at least one of torque demand, pressure across the compressor, and pressure gradient between the exhaust manifold and the intake manifold; and a VGT signal instructing lessening of a restriction provided by a variable restrictor turbine that is in-line with an exhaust manifold responsively to the determined at least one of torque demand, pressure across the compressor, and pressure gradient between the exhaust manifold and the intake manifold. The engine control unit further including a first output operable to output the generated at least one signal.

Referring now to FIG. 1, a diagram of one illustrative embodiment of a system 10 for controlling turbocharger compressor surge in a turbocharged internal combustion engine is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 22 for receiving fresh ambient air therefrom. Optionally, as shown in phantom in FIG. 1, system 10 may include an intake air cooler 24 of known construction disposed in-line with intake conduit 20 between the turbocharger compressor 16 and the intake manifold 14. Further optionally, as shown in phantom in FIG. 1, system 10 may include an intake charge valve 25 disposed in-line with intake conduit 20 between the turbocharger compressor 16 and the intake manifold 14. The turbocharger compressor 16 is mechanically and rotatably coupled to a variable geometry turbocharger turbine 26 via a drive shaft 28, wherein turbine 26 includes a turbine inlet fluidly coupled to an exhaust manifold 30 of engine 12 via an exhaust conduit 32, and further includes a turbine outlet fluidly coupled to ambient via an exhaust conduit 34. An EGR valve 36 is disposed in-line with an EGR conduit 38 fluidly coupled at one end to the intake conduit 20 and an opposite end to the exhaust conduit 32, and an EGR cooler 40 of known construction may optionally be disposed in-line with EGR conduit 38 between EGR valve 36 and intake conduit 20 as shown in phantom in FIG. 1.

System 10 includes a control computer 42 that is generally operable to control and manage the overall operation of engine 12. Control computer 42 includes a memory unit 45 as well as a number of inputs and outputs for interfacing with various sensors and systems coupled to engine 12. Control computer 42 is, in one embodiment, microprocessor-based and may be a known control unit sometimes referred to as an electronic or engine control module (ECM), electronic or engine control unit (ECU) or the like, or may alternatively be a general purpose control circuit capable of operation as will be described hereinafter. In any case, control computer 42 includes one or more control algorithms, as will be described in greater detail hereinafter, for controlling turbocharger compressor surge.

Control computer 42 includes a number of inputs for receiving signals from various sensors or sensing systems associated with system 10. For example, system 10 includes an engine speed sensor 48 electrically connected to an engine speed input, ES, of control computer 42 via signal path 50. Engine speed sensor 48 is operable to sense rotational speed of the engine 12 and produce a corresponding engine speed signal on signal path 50 indicative of engine rotational speed. In one embodiment, sensor 48 is a Hall effect sensor operable to determine engine speed by sensing passage thereby of a number of equi-angularly spaced teeth formed on a gear or tone wheel. Alternatively, engine speed sensor 48 may be any other known sensor operable as just described including, but not limited to, a variable reluctance sensor or the like.

System 10 further includes a compressor inlet pressure sensor 53 disposed in fluid communication with the fresh air intake conduit 22 adjacent to the fresh air inlet of the compressor 16 and electrically connected to a compressor inlet pressure input, CIP, of control computer 42 via signal path 55. Pressure sensor 53 may be of known construction, and is operable to produce a pressure signal on signal path 55 indicative of the pressure of fresh air entering the inlet of the compressor 16. Embodiments are envisioned where CIP is not measured, but rather estimated based on a signal indicating ambient air pressure from an ambient air pressure sensor (not shown). Indeed, whereas many values are discussed herein as being measured by a sensor or otherwise, embodiments are envisioned where such values are estimated from other values rather than being directly measured.

System 10 further includes a compressor outlet pressure sensor 49 disposed in fluid communication with the manifold intake conduit 20 adjacent to the air outlet of the compressor 16 and electrically connected to a compressor outlet pressure input, COP, of control computer 42 via signal path 51. Pressure sensor 49 may be of known construction, and is operable to produce a pressure signal on signal path 51 indicative of the pressure of charged air exiting the outlet of the compressor 16. Embodiments are envisioned where COP is not measured, but rather estimated based on other sensor readings (also called a virtual sensor).

System 10 further includes an intake manifold pressure sensor 52 disposed in fluid communication with intake manifold 14 and electrically connected to an intake manifold pressure input, IMP, of control computer 42 via signal path 54. Alternatively, pressure sensor 52 may be disposed in fluid communication with intake conduit 20. In any case, pressure sensor 52 may be of known construction, and is operable to produce a pressure signal on signal path 54 indicative of the pressure within intake conduit 20 and intake manifold 14. Embodiments are envisioned where IMP is not measured, but rather estimated based on other sensor readings (a "virtual sensor").

System 10 further includes a differential pressure sensor, or ΔP sensor, 60 fluidly coupled at one end to EGR conduit 38 adjacent to an exhaust gas inlet of EGR valve 36, and fluidly coupled at its opposite end to EGR conduit 38 adjacent to an exhaust gas outlet of EGR valve 36, via bypass conduit 62. Alternatively, the ΔP sensor 60 may be coupled across another flow restriction mechanism disposed in-line with EGR conduit 38. In any case, the ΔP sensor 60 may be of known construction and is electrically connected to a ΔP input of control computer 42 via signal path 64. The ΔP sensor 60 is operable to provide a differential pressure signal on signal path 64 indicative of the pressure differential across EGR valve 36 or other flow restriction mechanism as just described. Embodiments are envisioned where ΔP sensor 60 provides a signal from which EGR flow can be estimated. Still further, embodiments are envisioned where fresh air flow is measured and/or estimated via a fresh air flow sensor (not shown) or otherwise rather than EGR flow.

System 10 may further optionally include an engine exhaust pressure sensor 74 disposed in fluid communication with exhaust conduit 32 and electrically connected to an engine exhaust pressure input, EMP, of control computer 42 via signal path 76, as shown in phantom in FIG. 1. Alternatively, sensor 74 may be disposed in direct communication with the exhaust manifold 30. In either case, pressure sensor 74 is operable to provide a pressure signal on signal path 76 indicative of the pressure of exhaust gas produced by engine 12. It should be appreciated that exhaust pressure sensor 74 is optional in view of the intake manifold pressure sensor 52 and the differential pressure sensor 60. One of skill in the art recognizes that exhaust manifold pressure, or a rough estimation thereof, can be determined from the combination of the intake manifold pressure and the change in pressure across the EGR valve. Thus, in some embodiments, intake manifold pressure sensor 52 and exhaust manifold pressure sensor 74 are provided and differential pressure sensor 60 is optional. In such systems, the differential pressure is able to be determined by comparing IMP and EMP.

Figure 4:
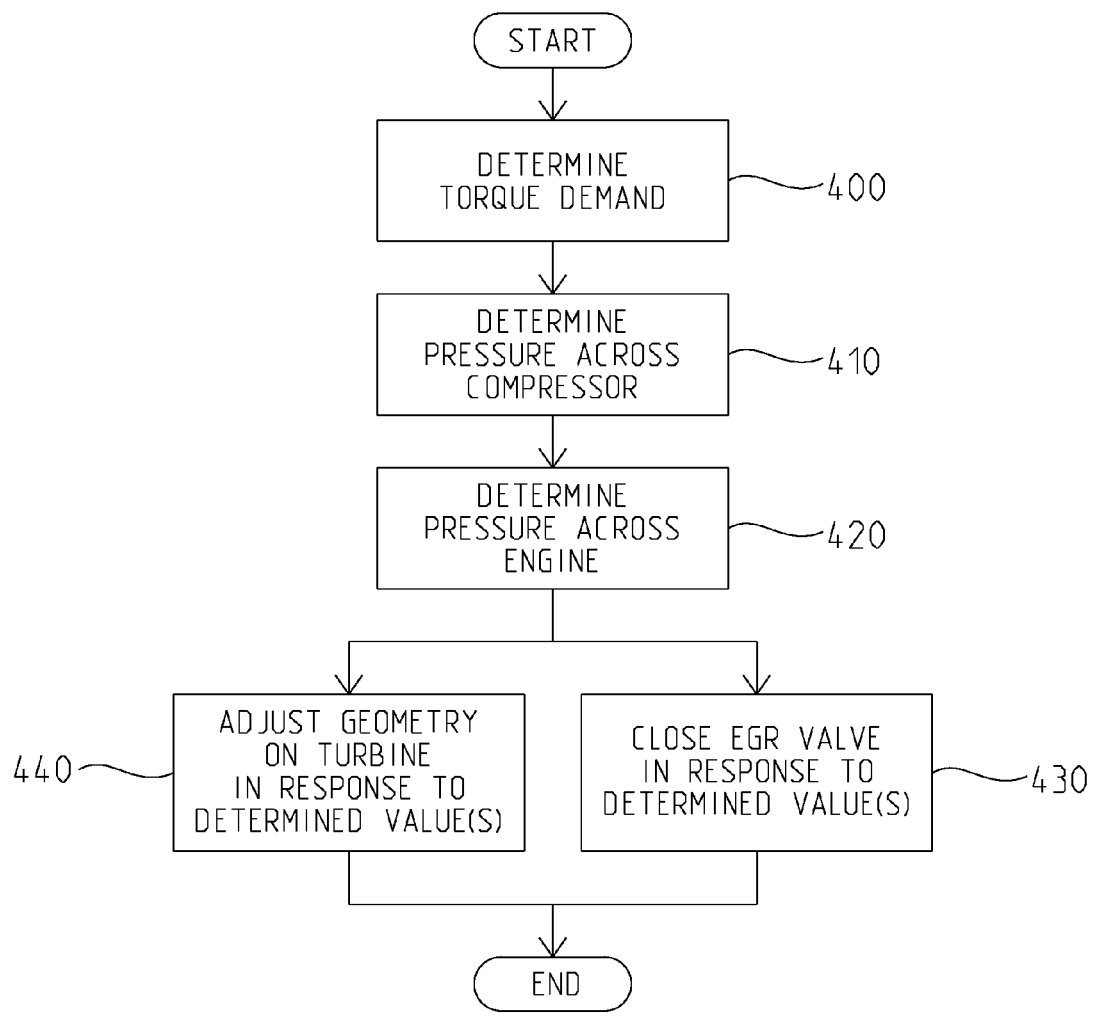
FIG. 4 is a block diagram of one illustrative embodiment of operation of the system of FIG. 1.

Control computer 42 also includes a number of other inputs. One such input is an indication of torque demand, TD via path 47. In one embodiment, TD is a signal indicative of a throttle position, such as a gas pedal. In one embodiment, a fueling command, FC, is used as an indication of torque demand. It should be appreciated that control computer 42, as discussed below, generates the fuel command, FC. Regardless, control computer 42 receives an indication of torque demand, from either an external (outside of control computer 42) or internal (inside of control computer 42) source, block 400, 500, FIG. 4. Still further, in another embodiment, engine speed, via engine speed sensor 48, is used as an indication of torque demand, TD. Embodiments are envisioned where engine speed from engine speed sensor 48 is used, prior to and after filtering to remove noise or other signal impurities.

Control computer 42 also includes a number of outputs for controlling one or more engine functions associated with system 10. For example, EGR valve 36 includes an EGR valve actuator 78 electrically connected to an EGR valve control output, EGRC, of control computer 42 via signal path 80. Control computer 42 is operable to produce an EGR valve control signal on signal path 80, and actuator 78 is responsive to the EGR valve control signal to control the position of EGR valve 36 relative to a reference position in a known manner. Control computer 42 is accordingly operable to control EGR valve 36 in a known manner to selectively provide a flow of recirculated exhaust gas from exhaust manifold 30 to intake manifold 14. EGR valve 36 further includes an EGR position sensor 66 electrically connected to an EGR valve position input, EGRP, of control computer 42 via signal path 68. Sensor 66 may be of known construction and is operable to determine a position of EGR valve 36 by determining a position of EGR valve actuator 78 relative to a reference actuator position, and producing a position signal on signal path 68 indicative of the position of EGR valve 36 relative to a reference position. Intake charge valve 25 includes an intake valve actuator 27, electrically connected to an intake valve control output, IVC, of control computer 42 via signal path 72. Control computer 42 is operable to produce an intake valve control signal on signal path 72, and actuator 29 is responsive to the intake valve control signal to control the position of intake valve 25 relative to a reference position in a known manner. Control computer 42 is accordingly operable to control intake valve 25, when present, in a known manner to adjust a flow gas into intake manifold 14. Intake valve 25 further includes an intake valve position sensor 31 electrically connected to an intake valve position input, IVP, of control computer 42 via signal path 46. Sensor 31 may be of known construction and is operable to determine a position of intake valve 25 by determining a position of intake valve actuator 29 relative to a reference actuator position, and producing a position signal on signal path 46 indicative of the position of intake valve 25 relative to a reference position.

System 10 further includes a variable geometry turbocharger (VGT) mechanism, shown generally as 82, and electrically connected to a VGT control output, VGTC, of control computer 42 via signal path 84. The VGT mechanism 82 may be embodied as any combination of a mechanical or electromechanical mechanism controllable in a known manner to modify the effective geometry of the turbocharger turbine 26, a wastegate disposed between conduits 32 and 34 and controllable in a known manner to selectively route exhaust gas around the turbine 26 and an exhaust throttle disposed in-line with either of conduits 32 and 34 and controllable in a known manner to selectively restrict exhaust gas flow through conduits 32 and 34 and turbine 26. Control computer 42 is accordingly operable to control any one or more of these VGT mechanisms in a known manner to selectively control the swallowing capacity and/or efficiency of the turbocharger 18.

System 10 further includes a fuel system 86 electrically connected to a fuel command output, FC, of control computer 42 via a number, K, of signal paths 88 wherein K may be any positive integer. Fuel system 86 is responsive to fueling commands, FC, produced by control computer 42 to supply fuel to engine 12 in a known manner.

Figure 2:
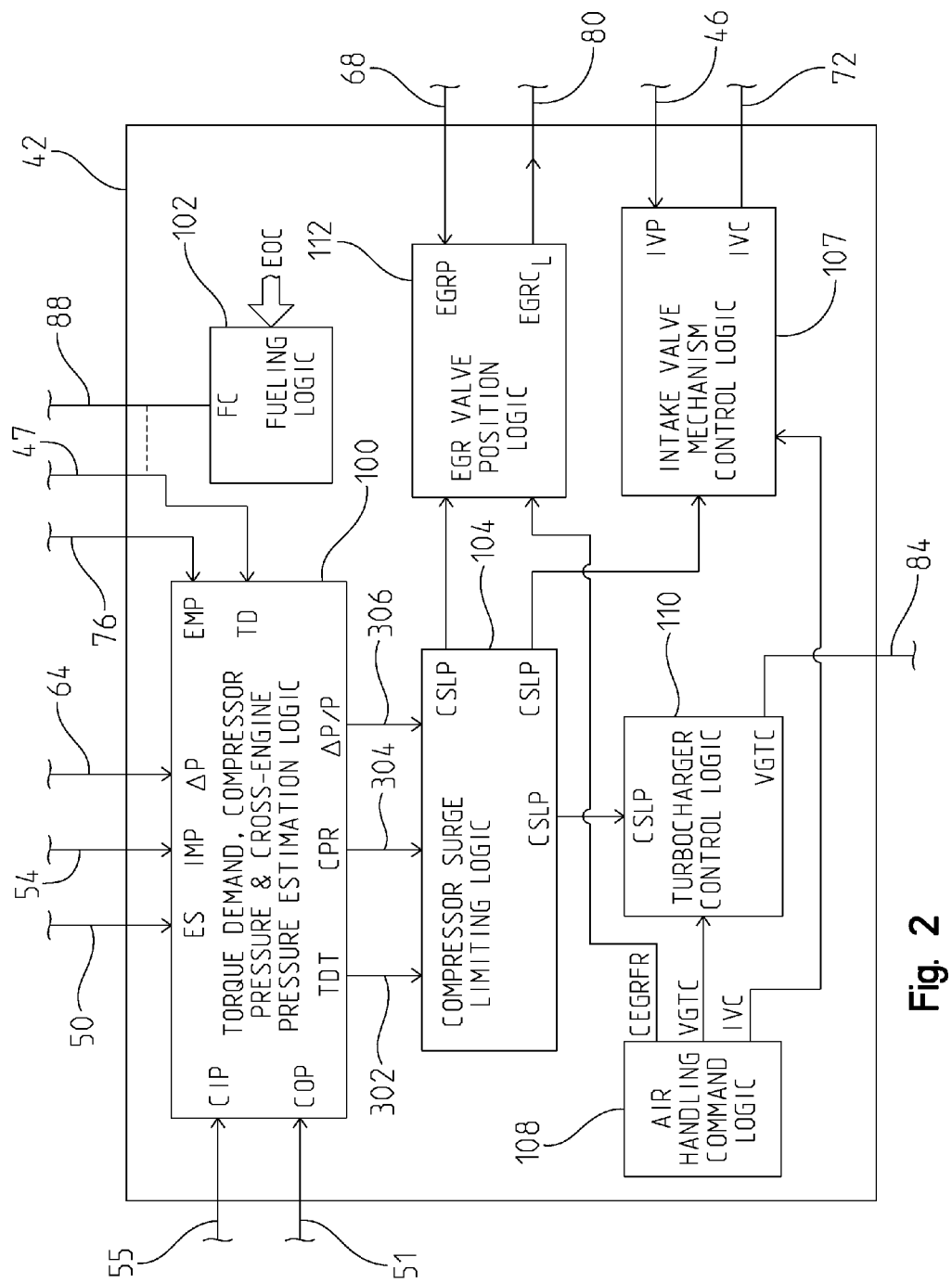
FIG. 2 is a block diagram of one illustrative configuration of some of the internal features of the control computer of FIG. 1 as they relate to controlling turbocharger compressor surge.

Referring now to FIG. 2, a block diagram of one illustrative configuration of some of the internal features of the control computer 42 of FIG. 1, as they relate to controlling turbocharger compressor surge, is shown. Control computer 42 includes a fueling determination block 102 receiving as inputs a number of engine operating condition values, EOC, including, for example, engine speed and other engine operating parameters, as is known in the art. Block 102 is responsive to the number of engine operating condition values, EOC, to determine a number of fueling parameters, including a mass fuel flow rate value and a start-of-fuel injection timing value, and to compute the fueling command, FC, as a function of these various fueling parameters, all in a manner well known in the art. The fueling determination block 102 is operable to provide the fueling command, FC, on signal path 88, and the fueling system 86 is responsive to the fueling command, FC, to supply fuel to engine 12 as described hereinabove. In some embodiments, FC is also provided to torque demand, cross-compressor pressure, and cross-engine pressure estimation block 100 as a value indicative of torque demand, TD, on path 47.

Torque demand, cross-compressor pressure, and cross-engine pressure estimation block 100 has an engine speed input, ES, receiving the engine speed signal on signal path 50, an intake manifold pressure input, IMP, receiving the intake manifold pressure signal on signal path 54, a delta pressure input, $\Delta P$, receiving the delta pressure signal on signal path 64, an exhaust manifold pressure input, EMP, receiving the exhaust manifold pressure signal on signal path 76, and a torque demand signal (as previously noted, FC and/or ES may serve as a torque demand signal) on path 47 (or 50). As shown previously noted, only two of IMP, $\Delta P$, and EMP are needed. Accordingly, embodiments are envisioned where one or more of the three is omitted. Block 100 further receives compressor intake pressure input, CIP, on signal path 55 and compressor outlet pressure, COP, on signal path 51. The torque demand, cross-compressor pressure, and cross-engine pressure estimation block 100 is operable, as will be more fully described hereinafter, to estimate and/or measure torque demand trend, TDT, to estimate and/or measure a ratio of the input and output pressures for the compressor, CPR, and to estimate and/or measure the pressure difference across the engine and compare it to the IMP, $\Delta P/P$, and provide these values at outputs, TDT, CPR, $\Delta P/P$, of block 100.

Control computer 42 further includes a compressor surge limiting logic block 104 having inputs receiving the torque demand trend, TD, and compressor input/output ratio, CPR, and pressure difference across the engine, $\Delta P/P$, values from logic block 100. It should be appreciated that while certain inputs are described as going to block 100 and being processed prior to being provided to block 104, certain embodiments are envisioned where the functions of each of blocks 100, 104 are combined into a single block and/or certain functionalities are shared and/or moved between the two blocks. The groupings of various functionalities in blocks is meant to be exemplary only and not limiting. In one embodiment, the compressor surge limiting logic block 104 is configured, as will be described in greater detail hereinafter, to produce one or more output signals, as a function of at least some of its input variables for controlling one or more of VGT mechanism 82, EGR valve 36, and intake valve 25. In one embodiment, the compressor surge limiting logic block 104 is configured, as will be described in greater detail hereinafter, to produce a compressor surge limiting parameter, CSLP, as a function of at least some of its input variables. CSLP is output to turbocharger control logic block 110, intake valve mechanism control logic 107, and EGR valve position logic block 112.

Control computer 42 further includes an air handling command logic block 108 producing a commanded EGR fraction value, CEGRFR, corresponding to a desired EGR fraction, wherein the EGR fraction is the fractional amount of recirculated exhaust gas in the charge air supplied to the intake manifold 14. The charge air supplied to the intake manifold 14 is generally understood to be a combination of fresh air supplied to the intake manifold 14 via compressor 16 and recirculated exhaust gas provided to the intake manifold 14 via EGR valve 36. Logic block 108 may additionally be configured to produce other command values, as illustrated in phantom in FIG. 2. In one embodiment, logic block 108 is configured to produce the commanded EGR fraction value, CEGRFR, as a function of ambient air temperature, engine speed and coolant temperature. Alternatively, the air handling command logic block 108 may be configured to produce at least the commanded EGR fraction value, CEGRFR, in any known manner as a function of one or more engine and/or air handling system operating conditions. Air handling command logic block 108 further provides output signals to turbocharger control logic block 110, and intake valve mechanism control logic 107.

Control computer 42 further includes a turbocharger control logic block 110 having a compressor surge limiting parameter input, CSLP, receiving the compressor surge limiting parameter, CSLP, from logic block 104. The turbocharger control logic block 110 is configured to limit and/or override the commanded variable geometry turbocharger command (received from air handling command logic block 108), VGTC, as a function of the compressor surge limiting parameter, CSLP, and to produce a correspondingly limited and/or overridden commanded turbocharger geometry setting, VGTC.

Control computer 42 further includes a EGR valve position logic block 112 having a compressor surge limiting parameter input, CSLP, receiving the compressor surge limiting parameter, CSLP, from logic block 104, the EGR valve position signal, EGRP, via path 68, and another input receiving the commanded EGR fraction value, CEGRFR, produced by the air handling command logic block 108. As it relates to the EGR fraction command, CEGRFR, produced by block 108, the EGR valve position logic block 112 is operable to control the position of the EGR valve 36 via a corresponding EGR value control signal, EGRC, that is based on CEGRFR to control the position of the EGR valve 36 so that the flow rate of exhaust gas therethrough is controlled as discussed below. The EGR valve position logic block 112 is configured to limit and/or override the commanded EGR fraction command, CEGRFR, as a function of the compressor surge limiting parameter, CSLP, and to produce a correspondingly limited and/or overridden commanded EGR fraction setting Control computer 42 further includes intake valve mechanism control logic 107. Intake valve mechanism control logic 107 receives CSLP input from compressor surge limiting logic 104 block (as well as inputs regarding normal operation of intake valve 25 from air handling command logic block 108 and regarding valve position, IVP, via path 46) and outputs a control signal, IVC, on path 72.

Figure 3:
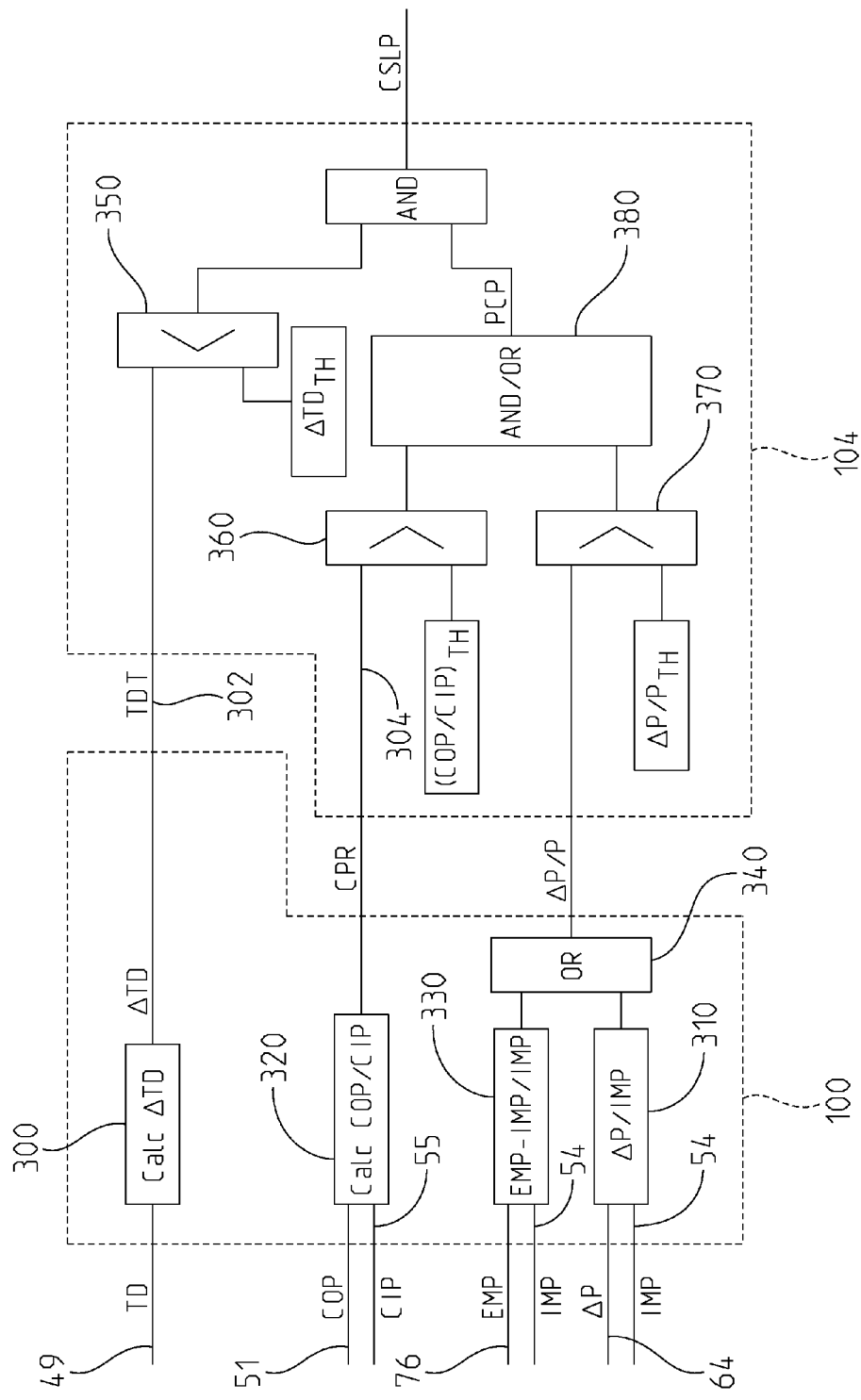
FIG. 3 is a block diagram of one illustrative configuration of the Torque demand, compressor pressure and cross-engine pressure estimation logic and compressor surge limiting logic block of FIG. 2.

In operation, as depicted in FIG. 3, the torque demand, compressor pressure and cross-engine pressure estimation logic block 100 is operable to measure and/or determine, as a function of current engine operating condition, the rate of change in torque demand, the ratio of the pressure at the compressor input to the pressure at the compressor outlet, and the change in pressure across the engine. As previously noted, logic block 100 receives TD on path 47. Block 100 uses TD to calculate a rate of change of TD ($\Delta TD$), block 300. This value is then output on path 302 to block 104.

Block 100 further receives COP on path 51 and receives CIP on path 55. Block 100 uses COP and CIP to calculate the ratio of COP to CIP (COP/CIP, CPR), block 320, FIG. 3; block 410, 510, FIG. 4. This value is then output on path 304 to block 104.

Block 100 also receives one or more of $\Delta P/P$ on path 64, EMP on path 76, an IMP on path 54. All such signals are shown in the figures as being received by block 100, FIG. 3 shows "OR" logic block 340 in phantom to represent that there are multiple ways that $\Delta P/P$ can be determined, block 420, 520, FIG. 4. Logic block 340 is not indicating that an OR logic chip or its equivalent is present and responsive to the shown signals. If necessary, block 100 determines $\Delta P/P$ by calculating (EMP-IMP)/IMP, block 330. In other embodiments, ΔP and IMP are used, block 310. ΔP/P signal is output by block 100 to block 104 via path 306.

Block 104 receives TDT (ΔTD) on path 302, CPR (COP/CIP) signal on path 304, and ΔP/P signal on path 306. Block 104 determines if TDT (ΔTD) is less than a threshold (ΔTD)$_{TH}$, at block 350. Accordingly, block 104 determines if the torque demand is dropping quickly. As a generalization, reduced torque demand is expected to slow the engine's intake of air and thus provides an increased likelihood of buildup of compressed air at the intake manifold. Furthermore, a quick dropoff in such demand is especially prone to such a buildup. The output of the comparison of the (ΔTD) to the (ΔTD)$_{TH}$ is illustratively a binary one that is either high or low. However, embodiments are envisioned where the output is a scaled value such that the degree/severity of the (ΔTD) can be considered by block 104.

Block 104 also determines if the CPR (COP/CIP) value is greater than a threshold (COP/CIP)$_{TH}$, block 360. Accordingly, block 104 determines if the pressure gain across the compressor is relatively high. As previously noted, COP is the pressure against which the compressor is pushing. CIP is a pressure that is, at least somewhat, aiding the movement of the vanes of the compressor. More accurately, the difference in pressure across the compressor is the force resisting movement of the compressor. Too great of a relative pressure gradient across the compressor stresses the compressor and provides conditions that may permit surge and/or chuff.

Block 104 also determines if ΔP/P is greater than a threshold ΔP/P$_{TH}$, block 370. As stated elsewhere, ΔP is EMP-IMP. IMP is the pressure that compressor 16 is pumping against. IMP is further the pressure that is available to pump through engine 12. Accordingly, a high pressure gradient between EMP and IMP relative to IMP, EMP, or 1 is indicative of relatively high resistance engine pumping and reduces the pumping efficiency of the overall signal.

Block 104 checks CPR and ΔP/P and if CPR, ΔP/P or both meet the stated conditions relative to their thresholds (to check if engine pressure conditions, compressor pressure conditions, or both are reached for a surge and/or chuff event to occur) and sets Pressure Condition Parameter, PCP accordingly. The AND/OR block 380 of FIG. 3 represents that CPR and ΔP/P can be used individually (OR logic block), or together (AND block). Block 104 monitors all of these conditions and if they (TDT, and at least one of CPR and ΔP/P) meet the stated condition relative to their thresholds, then CSLP signal is set to high. Overall, system 10 is detecting conditions that are indicative of a potentially likely near-term conditions in which surge and/or chuff can be expected. Thus, the system is somewhat predictive and then intervenes before the conditions conducive to surge and/or chuff can be created.

Upon producing a high CSLP signal, control computer 42 executes one or more actions to avoid surge and/or chuff. A first executable is illustrated as being executed by EGR Valve position logic block 112. The first executable overrides any EGR valve commands (from air handling command logic block 108 or otherwise) to fully close EGR valve 36, block 430, 530, FIG. 4. It should be appreciated that the pressure and exhaust gas in the exhaust manifold 30 and exhaust conduit 32 are what is available to drive turbocharger turbine 26. Having EGR valve 36 open allows some of that pressure and gas to be diverted to intake conduit 20 and intake manifold 14. Closing EGR valve 36 provides that all available pressure and exhaust gas is routed to turbocharger turbine 26. Thus, all available gas is directed to powering turbocharger turbine 26 and thereby providing power to compressor 16.

Figure 5:
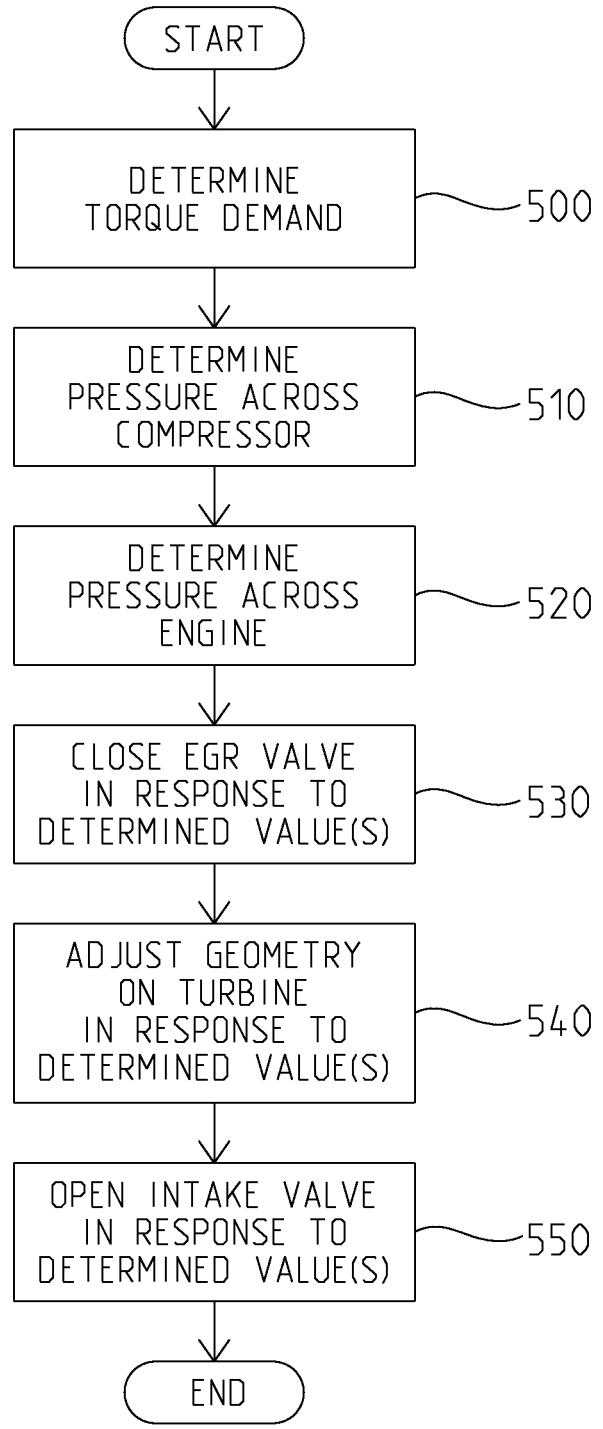
FIG. 5 is a block diagram of another illustrative embodiment of operation of the system of FIG. 1.

A second executable is executed by turbocharger control logic block 110. The second executable overrides control logic for setting the variable geometry gas turbine 26, block 440 (FIG. 4), 540 (FIG. 5). Accordingly, the VGTC signal on path 84 is set to adjust the geometry on turbine 26 to minimize the restriction on gas (and energy flow) through the turbine 26. In one embodiment, this is achieved by removing turbo interference via setting a turbo actuator to increase flow through the turbine 26. It should be appreciated that this again attempts to maximize the power provided to compressor 16.

A third executable is illustrated as being executed by intake valve limiting logic 107. Any closing or restriction provided by intake valve 25 potentially holds pressure at the compressor outlet and does not let such pressure be fully felt at the engine intake manifold 14. Accordingly, intake valve 25 potentially provides a hindrance to engine 12 consuming the charge air and pressure of intake conduit 20. Accordingly, upon receiving a high value of CLSP, the intake valve mechanism control logic 107 causes the opening, such as full opening, of intake valve 25, block 550, FIG. 5. Accordingly, the intake valve 25 is set to allow a more (or the most) efficient disposal of the compressed air in intake conduit 20 that compressor 16 is pushing against.

Overall, upon detection of conditions that are likely to cause surge and/or chuff in the immediate near term, control computer 42 takes actions to increase the power to compressor 16 and to reduce the resistance seen by compressor 16. Such actions reduce the likelihood of surge and/or chuff.

The measurement and/or determination of engine conditions is a constant and iterative process. Accordingly, the conditions that give rise to the output of a high signal for CSLP are typically transient. Upon the elimination of one of the two determined conditions (ΔTD), and PCP) CSLP ceases to be a high signal and the default operations of intake valve 25, EGR valve 36, and turbine 26 are resumed.

For any value that is described herein as being measured off of engine 12, it should be appreciated that such value may be estimated or calculated instead of directly measured by various ways known in the art.

The above detailed description and the examples described therein have been presented for the purposes of illustration and description only and not for limitation. For example, the operations described may be done in any suitable manner. The method steps may be done in any suitable order still providing the described operation and results. It is therefore contemplated that the present embodiments cover any and all modifications, variations or equivalents that fall within the spirit and scope of the basic underlying principles disclosed above and claimed herein.

What is claimed is:

1. A system for controlling turbocharger compressor surge, comprising:
    an internal combustion engine having intake and exhaust manifolds;
    a turbocharger including a compressor having an inlet fluidly coupled to ambient and an outlet fluidly coupled to the intake manifold;
    an exhaust gas recirculation (EGR) valve disposed in-line with an EGR conduit fluidly coupled between said intake and exhaust manifolds, said EGR valve responsive to an EGR valve control signal to control exhaust gas flow therethrough;
    a variable geometry turbine (VGT) fluidly coupled to the exhaust manifold, the VGT responsive to a VGT control signal to control the geometry thereof; and a control computer configured to determine torque demand, and at least one of pressure across the compressor and a pressure gradient ratio (ΔP/P) between the exhaust manifold and the intake manifold, the control computer determining that a first condition is met in response to the torque demand decreasing at a rate greater than a first threshold, and that at least one of a second condition is met in response to the pressure across the compressor being greater than a second threshold, and a third condition is met in response to the pressure gradient ratio (ΔP/P) between the exhaust manifold and the intake manifold being greater than a third threshold; the control computer being configured to:
1. close the EGR valve in response to the first condition being met, and at least one of the second condition and the third condition being met,
2. lessen a restriction provided by the VGT responsive to the first condition being met, and at least one of the second condition and the third condition being met;
3. cause default operation of the EGR valve in response to the first condition no longer being met or the at least one of the second condition and the third condition no longer being met and
4. cause default operation of the VGT in response to the first condition no longer being met or the at least one of the second condition and the third condition no longer being met.

2. The system of claim 1, wherein ΔP/P is defined as the difference between an exhaust manifold pressure input and an intake manifold pressure input relative to the intake manifold pressure input.

3. The system of claim 1, wherein the control computer further determines if the first condition is met, determines if the second condition is met, and determines if the third condition is met.

4. The system of claim 1, wherein the first, second, and third conditions are indicative of expected compressor surge responsive to the determined torque demand, pressure across the compressor, and pressure gradient ratio (ΔP/P).

5. The system of claim 1, further including a compressor inlet pressure sensor producing a compressor inlet pressure signal indicative of turbocharger compressor inlet pressure and a compressor outlet pressure sensor producing a compressor outlet pressure signal (directly or indirectly) indicative of turbocharger compressor outlet pressure, and wherein the computer determines the pressure across the compressor as a function of signals received from the compressor inlet pressure sensor and compressor outlet pressure sensor.

6. The system of claim 1, wherein a value of an amount of fuel to be supplied to the engine is calculated from the determined torque demand.

7. The system of claim 1, further including an intake charge valve fluidly disposed between the compressor and the intake manifold, wherein the intake charge valve is responsive to an intake charge valve signal, and the control computer is operable to issue an intake charge valve "full open" signal when closing the EGR valve in response to the first condition being met, and at least one of the second condition, and the third condition being met.

8. The system of claim 1, wherein the third threshold is a threshold pressure gradient ratio (ΔP/P$_{TH}$), and a high value for the pressure gradient ratio (ΔP/P) relative to the third threshold is indicative of high resistance engine pumping.

9. A method of operating a turbocharger compressor including:

determining torque demand, and at least one of pressure across the compressor, and pressure gradient ratio (ΔP/P) between an exhaust manifold and an intake manifold of an engine coupled to the compressor;
determining that a first condition is met in response to the torque demand decreasing by an amount greater than a first threshold;
determining that at least one of a second condition is met in response to the pressure across the compressor being greater than a second threshold and a third condition is met in response to the pressure gradient ratio (ΔP/P) between an exhaust manifold and an intake manifold of an engine coupled to the compressor being greater than a third threshold, and
closing an EGR valve of the engine in response to the first condition being met, and at least one of the second condition and the third condition being met;
lessening a restriction provided by a variable restrictor turbine that is in-line with an exhaust manifold in response to the first condition being met; and at least one of the second condition and the third condition being met;
causing default operation of the EGR valve in response to the first condition no longer being met or the at least one of the second condition and the third condition no longer being met and
causing default operation of the VGT in response to the first condition no longer being met or the at least one of the second condition and the third condition no longer being met.

10. The method of claim 9, wherein ΔP/P is defined as the difference between an exhaust manifold pressure input and an intake manifold pressure input relative to the intake manifold pressure input.

11. The method of claim 9, wherein the restriction of the variable restrictor turbine is performed according to a process that balances the reduction of intake manifold pressure with the energy supplied to the compressor.

12. The method of claim 9, further including:
determining that the first condition is met,
determining that the second condition is met, and
determining that the third condition is met,
wherein closing the EGR valve of the engine is performed in response to determining that the first, the second, and the third conditions are satisfied.

13. The method of claim 9, further including fully opening an intake charge valve fluidly disposed between the compressor and the intake manifold in response to the first condition being met, and at least one of the second condition and the third condition being met.

14. A non-transitory computer-readable media having instructions thereon for controlling operation of an engine, the instructions, when interpreted by a processor, cause the processor to:
determine torque demand, and at least one of pressure across the compressor, and pressure gradient ratio (ΔP/P), wherein ΔP/P includes the difference between an exhaust manifold pressure input and an intake manifold pressure input relative to one of the intake manifold pressure input;
determine that a first condition is met in response to the torque demand decreasing by an amount greater than a first threshold, and that at least one of a second condition is met in response to the pressure across the compressor being greater than a second threshold and a third condition is met in response to the pressure gradient ratio (ΔP/P) between an exhaust manifold and an intake manifold of an engine coupled to the compressor being greater than a third threshold; and emit at least one signal configured to:

1) close an EGR valve of the engine in response to the first condition being met and at least one of the second condition and the third condition being met;
2) lessen a restriction provided by a variable restrictor turbine that is in-line with an exhaust manifold responsively to the first condition being met and at least one of the second condition and the third condition being met;
3) cause default operation of the EGR valve in response to the first condition no longer being met or the at least one of the second condition and the third condition no longer being met, and
4) cause default operation of the VGT in response to the first condition no longer being met or the at least one of the second condition and the third condition no longer being met.

15. An engine control unit including:

a first input operable to receive a signal indicative of whether a first condition is met such that torque demand is decreasing at a rate greater than a first threshold, and whether at least one of a second condition is met such that pressure across the compressor is greater than a second threshold, and a third condition is met such that a pressure gradient ratio ($\Delta P/P$) between the exhaust manifold and the intake manifold is greater than a third threshold;

a processor configured to generate:

1) an EGR valve signal instructing closure of the EGR valve in response to the first condition being met and at least one of the second condition and the third condition being met;
2) a VGT signal instructing lessening of a restriction provided by a variable restrictor turbine that is in-line with an exhaust manifold responsively to the first condition being met and at least one of the second condition and the third condition being met;
3) an EGR valve signal causing default operation of the EGR valve in response to the first condition no longer being met or the at least one of the second condition and the third condition no longer being met; and
4) a VGT signal causing default operation of the VGT in response to the first condition no longer being met or the at least one of the second condition and the third condition no longer being met; and at least one output operable to output the generated EGR valve signal and the generated VGT signal.

* * * * *